(12) United States Patent
Kolnberger et al.

(10) Patent No.: US 11,148,332 B2
(45) Date of Patent: Oct. 19, 2021

(54) INJECTION MOLDING NOZZLE FOR MANUFACTURING INJECTION MOLDED COMPONENTS FROM PLASTIC

(71) Applicant: Haidlmair Holding GMBH, Nussbach (AT)

(72) Inventors: Patrick Kolnberger, Inzersdorf (AT); Willibald Windhager, Molln (AT)

(73) Assignee: HAIDLMAIR HOLDING GMBH, Nussbach (AT)

( * ) Notice: Subject to any disclaimer, the term of this patent is extended or adjusted under 35 U.S.C. 154(b) by 44 days.

(21) Appl. No.: 15/510,066

(22) PCT Filed: Sep. 10, 2015

(86) PCT No.: PCT/EP2015/001825
§ 371 (c)(1),
(2) Date: Mar. 9, 2017

(87) PCT Pub. No.: WO2016/037704
PCT Pub. Date: Mar. 17, 2016

(65) Prior Publication Data
US 2017/0239865 A1      Aug. 24, 2017

(30) Foreign Application Priority Data

Sep. 10, 2014   (AT) .............................. A 50631/2014

(51) Int. Cl.
*B29C 45/30*       (2006.01)
*B29C 45/27*       (2006.01)
*B29K 105/00*    (2006.01)

(52) U.S. Cl.
CPC ...... *B29C 45/2708* (2013.01); *B29C 45/2725* (2013.01); *B29C 45/30* (2013.01);
(Continued)

(58) Field of Classification Search
CPC ..... B29C 45/20; B29C 45/2708; B29C 45/30; B29C 2045/2714; B29C 45/2806;
(Continued)

(56) References Cited

U.S. PATENT DOCUMENTS 4,033,485 A * 7/1977 Kohler .................... B29C 45/22
                                                                  222/146.5
4,120,086 A * 10/1978 Crandell ............ B22D 17/2272
                                                                     29/611
(Continued)

FOREIGN PATENT DOCUMENTS

CA      2509110 A1 * 12/2005  ........... B29C 45/278
CN      1651213 A      8/2005
(Continued)

OTHER PUBLICATIONS

Baensch Klaus Peter, Machine Translation of DE 4125975-Claims (Year: 1993).*
(Continued)

*Primary Examiner* — Timothy Kennedy
*Assistant Examiner* — Alexander A Wang
(74) *Attorney, Agent, or Firm* — Medler Ferro Woodhouse & Mills

(57) ABSTRACT

The present invention refers to an injection molding nozzle for introducing a molten plastic to a mold cavity (15) of an injection molding tool via a slot gate (2, 2, 3). The injection molding nozzle includes a nozzle core (2, 3, 3) having an elongate edge (3B) and is received in an opening (1A, 1) in a housing (1, 1). A portion of the nozzle core (2, 3, 3) is spaced apart from the housing (1, 1) so as to define a nozzle flow channel that is in fluid communication between a source of the molten plastic and the slot gate (2, 2, 3), and at least a downstream portion of the nozzle flow channel that
(Continued)

is between the housing (1, 1) and the nozzle core (2, 3, 3) surrounds the nozzle core (2, 3, 3) on all sides.

25 Claims, 6 Drawing Sheets

(52) U.S. Cl.
CPC ............ *B29C 2045/2714* (2013.01); *B29K 2105/0067* (2013.01)

(58) Field of Classification Search
CPC ........... B29C 45/26; B29C 2911/14093; B29C 45/76; B29C 2045/302; B29C 2045/304; B29C 2045/306; B29C 2045/308; B29C 45/2725
See application file for complete search history.

(56) References Cited

U.S. PATENT DOCUMENTS

| | | | |
|---|---|---|---|
| 4,289,473 A | 9/1981 | Von Holdt | |
| 4,412,805 A | 11/1983 | Morrison | |
| 4,576,567 A * | 3/1986 | Gellert | B29C 45/30 425/549 |
| 4,586,887 A | 5/1986 | Gellert | |
| 5,219,593 A | 6/1993 | Schmidt et al. | |
| 5,284,436 A * | 2/1994 | Gellert | B29C 45/30 264/328.15 |
| 5,318,434 A * | 6/1994 | Gellert | B29C 45/30 264/328.15 |
| 6,524,093 B2 | 2/2003 | Bouti | |
| 7,458,806 B2 | 12/2008 | Barth | |
| 7,862,755 B2 | 1/2011 | Elgindi | |
| 8,915,290 B2 | 12/2014 | Müller | |
| 2002/0071888 A1 * | 6/2002 | Bouti | B29C 45/30 425/549 |
| 2007/0003661 A1 | 1/2007 | Ciccone | |
| 2008/0031997 A1 | 2/2008 | Bazzo et al. | |
| 2010/0209547 A1 * | 8/2010 | Heissler | B29C 45/2806 425/563 |
| 2012/0219651 A1 * | 8/2012 | Weber | B29C 45/0025 425/149 |

FOREIGN PATENT DOCUMENTS

| | | | |
|---|---|---|---|
| DE | 41 25 975 | 2/1993 | |
| DE | 4125975 A1 | 2/1993 | |
| EP | 0 162 438 | 11/1985 | |
| EP | 0 241 040 A1 | 10/1987 | |
| EP | 0 299 333 | 1/1989 | |
| EP | 0299333 A1 * | 1/1989 | ............ B23P 15/007 |
| EP | 0 552 672 A1 | 7/1993 | |
| EP | 1 561 564 | 8/2005 | |
| GB | 802 381 A | 10/1958 | |
| GB | 1 069 095 A | 5/1967 | |
| JP | H02-032825 | 2/1990 | |
| JP | H05-269826 A | 10/1993 | |
| JP | H06-254927 | 9/1994 | |
| JP | H08-057905 A | 3/1996 | |
| JP | H08-197583 A | 8/1996 | |
| WO | 2011/033538 A1 | 3/2011 | |

OTHER PUBLICATIONS

Baensch Klaus Peter, Machine Translation of DE 4125975-Description (Year: 1993).*
International Search Report dated Nov. 25, 2015 in PCT/EP2015/001825.
Unger, P: "Heißkanalsystem mit indirekt beheiztem Wärmeleittorpedo," Kunstoffe, Carl Hanser Verlag, Muchen, DE, vol. 70, No. 11, Nov. 1, 1980, pp. 730-737, XP001176414.
"Das Ende des Fadens," Plastverarbeiter, Heuthig GMBH, Heidelberg, DE, No. 7, Jul. 1, 1999, p. 74/75, XP000958841.
Canadian Intellectual Property Office. Canadian Patent Application No. 2,960,741. Canadian Office Action dated Feb. 19, 2018.
Office Action dated May 29, 2018 in corresponding Japanese Patent Application No. 2017-533693.
First Office Action and Search Report issued in Chinese Application No. 201580060836.3, dated Jul. 19, 2018.

* cited by examiner

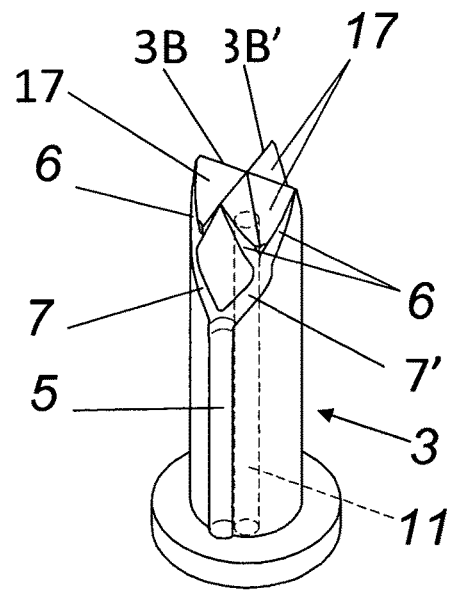
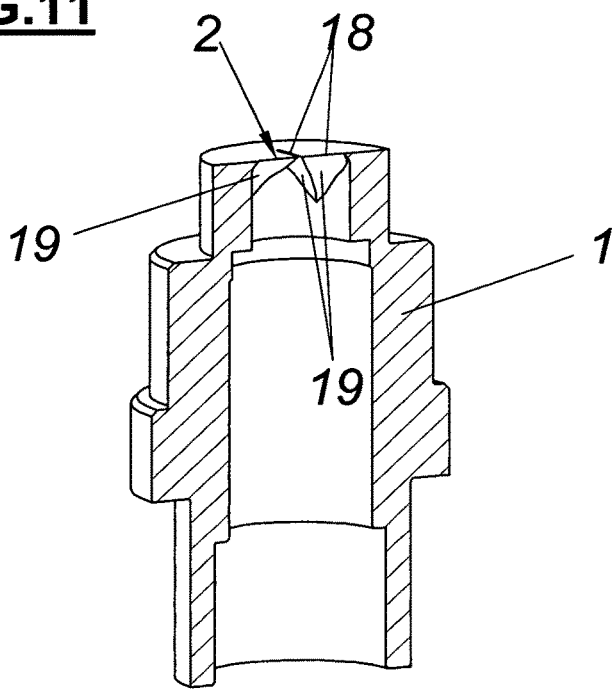
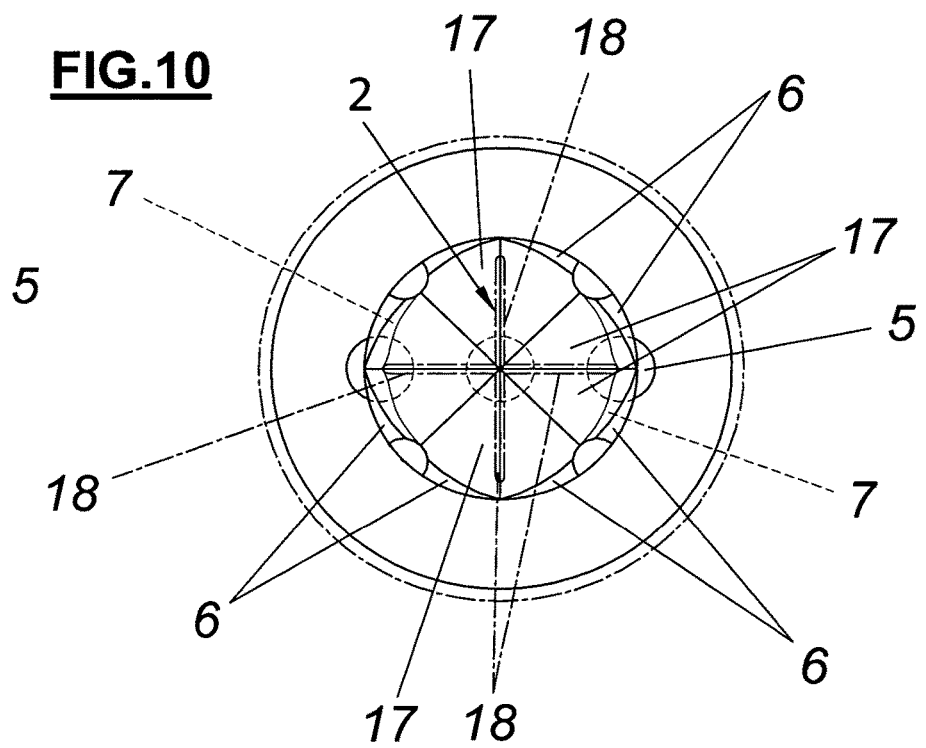

INJECTION MOLDING NOZZLE FOR MANUFACTURING INJECTION MOLDED COMPONENTS FROM PLASTIC

FIELD OF THE INVENTION

The invention refers to an injection molding nozzle according to the preamble of claim 1.

BACKGROUND

Such an injection molding nozzle is know from DE 41 25 975 A1. According to this reference, molten plastic enters a nozzle as a single melt stream, and is divided into two discrete band shaped extrudates that are injected through a slot gate. The divided band shape extrudates are kept separate from each other by a torpedo that extends across the flow path, and are not able to recombine until downstream from the torpedo. This scenario may very often lead to blemishes in the molded part that result from the streams merging together after the torpedo, and immediately prior to the slot gate.

SUMMARY OF THE INVENTION

The problem therefore underlying the present invention is to develop an injection molding nozzle for injecting a molten plastic into a mold cavity without having to fear an unacceptable impairment of the quality of the injection molded component.

The present invention solves the problem at hand by providing an injection molding nozzle according to claim 1. In accordance with the invention a portion of a nozzle core that is received in the opening in a housing is spaced apart from the housing so as to define a nozzle flow channel there between that includes a manifold, a throttle zone, and a nozzle runner. The nozzle flow channel is in fluid communication between a source of molten plastic and a slot gate, and at least a downstream portion of the nozzle flow channel surrounds the nozzle core on all sides so as to create a continuous flow front of molding material between the nozzle core and the housing ahead of or prior to the slot gate. The flow front of molding material in the downstream portion of the nozzle flow channel that surrounds the nozzle core on all sides has spaced apart longitudinal sides that are connected together by ends, the lengths and widths of which preferably taper in the direction of the direction of flow towards the slot gate. Such a configuration promotes relatively higher throughput of molding material into the mold cavity while also reducing the likelihood of weld lines or other impairments in the injection molded parts.

An aspect of the present invention is based on the recognition that the shear stress of a molten plastic injected into a cavity through a slot nozzle is comparable to the shear stress in a round nozzle, the diameter of which approximately corresponds to the slot width.

In accordance with an aspect of the present invention, the melt throughput can be increased at will by the choice of the width of the band-shaped extrudate, without having to fear an unacceptable increased shear stress and the potentially detrimental consequences of an ensuing temperature increase of the plastic above its permissible melt temperatures. A prerequisite for sprue tear-off on demolding of the injection molded component is an appropriate temperature gradient between the molten plastic in the cooled cavity and the sprue over a suitable longitudinal extension of the slotted nozzle, so that the temperature-dependent mechanical strength of the plastic in the transition area between the sprue and the injection molded component during the latter's demolding causes tear-off of the sprue in the area of the nozzle opening, without necessarily drawing threads. Such an adjustment of the temperature gradient in the transition area between the sprue and the solidified injection molded component is achieved by supplying heat to the sprue, in the area of which the plastic therefore remains in the molten state during solidification of the injection molded component in the cooled cavity. The nozzle area otherwise forming the sprue to be removed is consequently part of the hot runner of the injection molding nozzle. The transition thus produced in the form of a thin layer in the area of the nozzle opening between the liquid melt and the solidified plastic body results in sprue tear-off in the area of the nozzle opening and hence in tear-off along a narrow surface area of the injection molded component, thereby making post-processing of the tear-off point generally superfluous.

In accordance with an aspect of the present invention, in order to achieve advantageous temperature control of the molten plastic during injection into a cavity, temperature controlled according to the solidification temperature of the plastic employed and generally cooled, an injection molding nozzle with a housing receiving a heatable nozzle core, with a nozzle runner ending in a nozzle opening and tapering in the direction of flow between the housing and the nozzle core and with a manifold between a feeder for the molten plastic and the nozzle runner can be taken as a basis. In contrast to known injection molding nozzles of this kind, the nozzle opening is in the form a slot gate, wherein the nozzle runner adapted to the slot gate connects to at least one manifold, which is in fluid communication with the nozzle runner by means of a throttle zone. An aspect for advantageous introduction of the molten plastic into the cavity of an injection molding tool via a slot gate is the distribution of the melt flow over the length of the slot gate according to rheological criteria, as only in this way it is possible to promote an increase in the melt throughput essentially depending on the slot length. For this reason, the nozzle runner adapted to the slot gate is connected to the manifold by means of a throttle zone, which is preferably formed by a constriction of the flow cross-section extending over the length of the longitudinal section of the slot gate corresponding to the manifold.

In accordance with an aspect of the present invention, the molten plastic fed through a feeder channel is initially distributed with the aid of the manifold over a flow section corresponding to the length of the longitudinal section of the slot gate corresponding to the manifold, such that the throttle zone is charged with molten plastic over a suitable extension range and promotes a distribution of the melt flow fulfilling the respective rheological requirements over the length of the slot gate. Furthermore, the temperature of the melt flow can be controlled with the aid of the heated nozzle core forming a wall of the nozzle runner before emerging from the nozzle slot, so that with a melt flow thus controlled with regard to its temperature and flow distribution, the molten plastic can be introduced in an advantageous fashion into the cavity of an injection molding tool, without having to fear detrimental overburdening of the plastic. According to an aspect of an embodiment of the present invention, more plastic material can be introduced into a cavity accordingly with unchanged or reduced flow velocity. Lower flow velocities generally imply lower shear stresses on the molten plastic, thereby reducing the risk of unacceptable material damage and consequently losses in strength. This promotes the prerequisites for true-to-form, high quality injection molded components, while maintaining relatively rapid cycle times.

In accordance with an aspect of the present invention the flow cross-section of the manifold may taper in the direction of flow in order to distribute the melt flow over the extension range of the throttle zone crossways in relation to the direction of flow and in order to avoid dead flow spaces. Furthermore, the flow resistance of the throttle zone may change over the length of the section of the nozzle slot corresponding to the manifold. The flow distribution of the molten plastic emerging from the nozzle slot can be influenced by these measures in isolation or in combination with one another.

In accordance with an aspect of the present invention the manifold via which the throttle zone is charged with molten plastic could be allocated to the housing. Simpler design conditions result however if the nozzle core forms the manifold in the shape of a recess open against the housing, which creates a simple handling access owing to its position on the outside of the nozzle core. Furthermore, the enlarged surface of the manifold in the area of the nozzle core has a beneficial effect on the heat transfer from the heated nozzle core to the molten plastic. The manifold margin located opposite the recess of the nozzle core can be formed by the housing, but also by a housing insert.

In accordance with an aspect of the present invention, if the nozzle runner surrounds the nozzle core on all sides, a more uniform temperature distribution of the molten plastic can be achieved, particularly at the ends of the nozzle slot. Furthermore, improved guidance of the melt flow results at the ends of the nozzle slot, leading to an enhancement in quality for the injection molded component to be manufactured.

In accordance with an aspect of the present invention, for improved distribution of the melt flow over a suitable extension range of the throttle zone, the nozzle runner can be connected to at least two manifolds which together surround the nozzle core, and, by means of which the molten plastic can be more precisely distributed. This applies above all to the supply of melt from longitudinal sides of the nozzle core opposite each other in relation to the longitudinal axis of the nozzle slot, which (nozzle core) can then present on longitudinal sides opposite each other one manifold respectively connected to the nozzle runner by means of a throttle zone.

In accordance with an aspect of the present invention, uniform charging of the throttle zone in the joint area between two manifolds can be improved by the manifolds being connected to each other at their flow ends. This measure also helps to avoid the formation of weld lines otherwise possible owing to such a joint area. Furthermore, different plastics can be injected using a common injection molding nozzle into the cavity of an injection molding tool via two or more manifolds that receive molding material from separate feeder channels.

In accordance with an aspect of the present invention, in order to improve the outflow conditions of the molten plastic from the nozzle slot, the nozzle core may form an inflow section connecting to the throttle zone in the area of the nozzle runner and a downstream outflow section presenting a smaller angle of inclination in relation to the nozzle outflow direction in comparison to that of the inflow section. The outflow section provides a guide surface for the molten plastic, which is therefore diverted in the outflow direction of the nozzle slot.

In accordance with an aspect of the present invention, the housing of the injection molding nozzle forms together with the outer surface featuring the nozzle slot a mold surface of the injection molding tool which delimits the cavity and therefore, in many applications, particularly in the case of cooled injection molding tools, be cooled at least in this outer area. Since heat is applied to the molten plastic via the nozzle core, in some applications, it is recommended that the housing be provided with thermal insulation against the heated nozzle core, which may not only have an effect on energy management, but may also beneficially influence the temperature profile within the melt flow, with the result that under certain circumstances, the injection pressure can be reduced.

In accordance with an aspect of the present invention, in order to be able to influence sprue tear-off constructively, the nozzle core for closing the nozzle slot can be movably mounted in the housing and be connected to an appropriate actuator, so that after the cavity has been filled with plastic, the nozzle slot is closed and therefore the sprue can be separated from the injection molded component. Furthermore, the dwell time of the injection molded component in the cavity can often be shortened, since there is no need to wait for solidification of the molten plastic in the area of the nozzle opening.

In accordance with an aspect of the present invention, as has already been mentioned, the temperature of the injection molding tool is preferably controlled according to the solidification temperature of the plastic respectively used, so that the molten plastic injected into the cavity solidifies into the injection molded component while maintaining short cycle times. The progress of solidification of the molten plastic in the area of the nozzle slot acquires particular importance in this case with regard to sprue tear-off. For this reason, the housing can be cooled in the area of the nozzle slot with the effect that an intended temperature gradient is promoted between the solidified injection molded component and the molten sprue in the area of the nozzle slot.

In accordance with an aspect of the present invention, particularly favorable design conditions may result when the housing forms a mold plate delimiting the cavity of the injection molding tool, as this dispenses with the need to create the housing as a flush-fit insert for a mold plate. Moreover, a mold plate that forms the housing for the injection nozzle may also promote uniform temperature control of the injection molding tool.

In accordance with an aspect of the present invention, in order to be able to increase the melt throughput by an injection molding nozzle with a limited amount of space available without detrimentally increasing the shear stresses, the nozzle slot and the nozzle runner leading into the nozzle slot can feature several branches, preferably arranged in a star shape, so that the length of the nozzle slot determining the melt throughput is extended into several branches owing to the slot distribution and to be more precise, with limited spatial requirements for the housing.

In accordance with an aspect of the present invention, if the nozzle core has a plain cylindrical basic shape with two roof areas symmetrical in relation to the longitudinal axis of the nozzle slot and in relation to the branches of the nozzle slot in the area of the nozzle runner. In some applications this results in advantageous design conditions, as is familiar from use of round nozzles. The melt throughput remains limited however as a result of the set limits for the diameter of the cylindrical core body, if the nozzle slot is not divided into several branches through formation of a cross recess for example.

According to an aspect of the present invention an injection molding nozzle of the type disclosed herein with a nozzle slot may result in a design simplification of injection molding tools with two or several cavities if a common injection molding nozzle is allocated to at least two cavities, with its nozzle slot extending on both sides of a partition between the cavities.

BRIEF DESCRIPTION OF THE DRAWINGS

The foregoing and other features and advantages of the invention will be apparent from the following description of embodiments thereof as illustrated in the accompanying drawings. The accompanying drawings, which are incorporated herein and form a part of the specification, further serve to explain the principles of the invention and to enable a person skilled in the pertinent art to make and use the invention. The drawings are not to scale.

FIG. 9 is a perspective view of a nozzle core in accordance with an embodiment of the present invention for use with a housing having a cross-shaped slot gte slot.

FIG. 10 is an enlarged top view of the nozzle core of FIG. 9.

FIG. 11 is a perspective sectional view of the nozzle housing for use with the nozzle core of FIGS. 9 and 10.

DETAILED DESCRIPTION OF THE DRAWINGS

Specific embodiments of the present invention are now described with reference to the figures, wherein like reference numbers indicate identical or functionally similar elements. The following detailed description is merely exemplary in nature and is not intended to limit the invention or the application and uses of the invention. In the following description, "downstream" is used with reference to the direction of I flow of molten plastic from an injection unit of an injection molding machine to a mold cavity of an injection molding tool, and also with reference to the order of components or features thereof through which the mold material flows from the injection unit to the mold cavity, whereas "upstream" is used with reference to the opposite direction. Furthermore, there is no intention to be bound by any expressed or implied theory presented in the preceding technical field, background, brief summary or the following detailed description.

Figure 1:
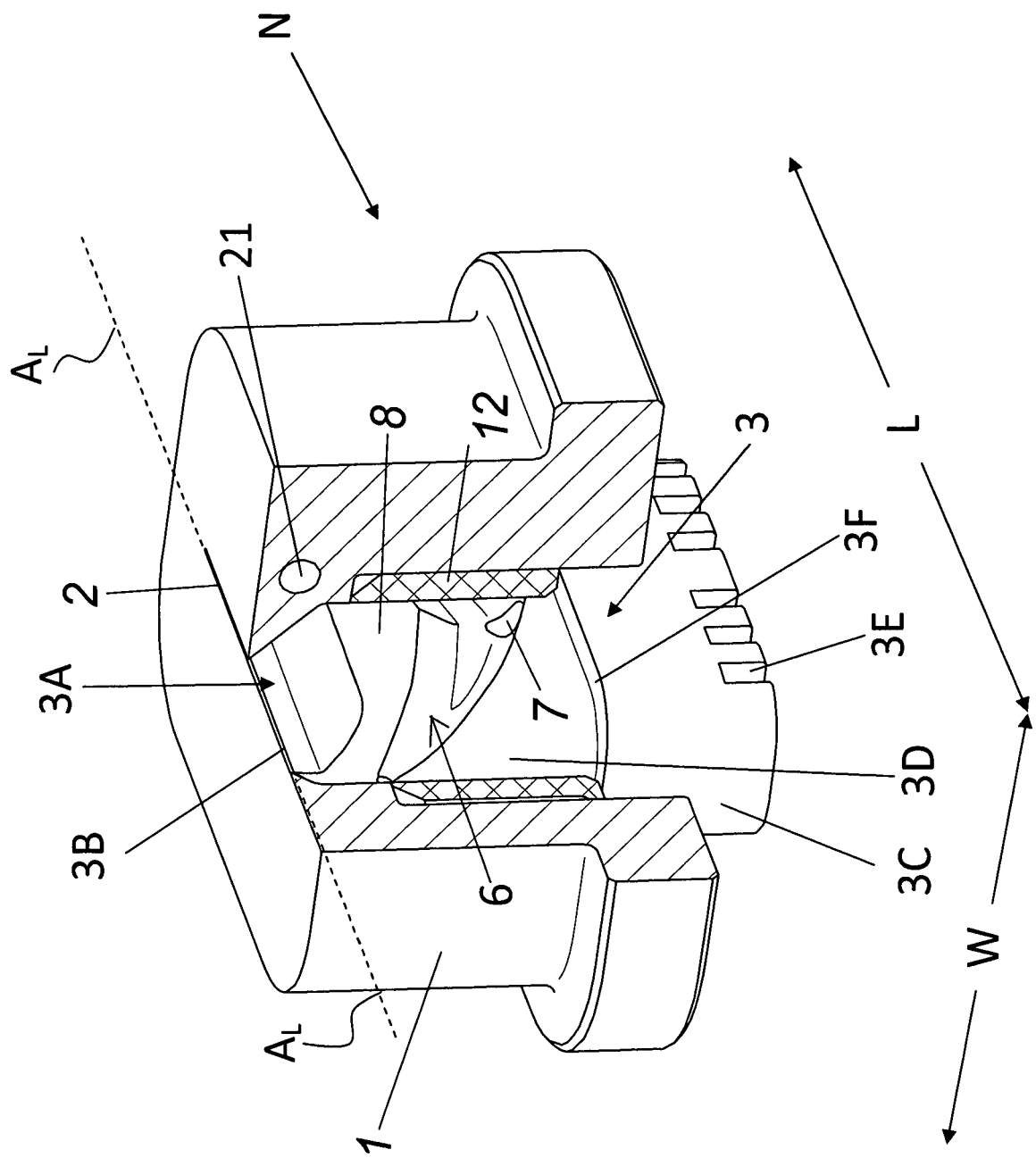
FIG. 1 is a partial sectional view of an injection molding nozzle for introducing a molten plastic to a mold cavity of an injection molding tool via a nozzle slot or slot gate in accordance with an embodiment of the present invention.
Figure 2:
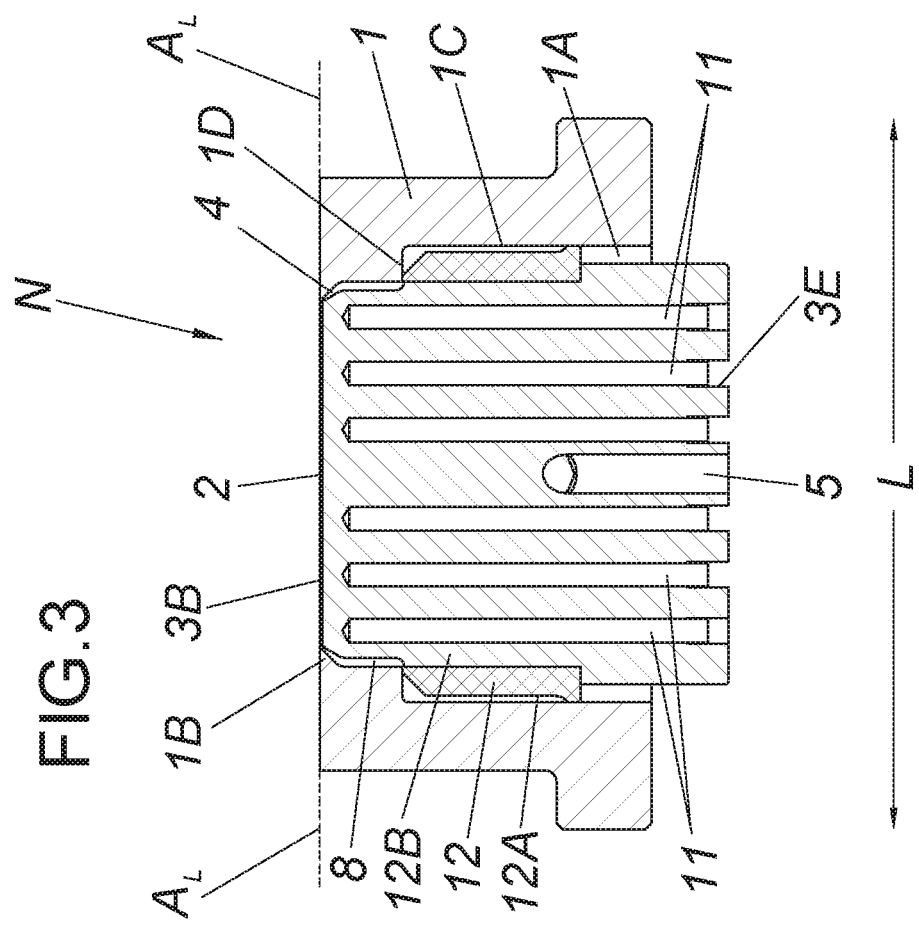
FIG. 2 is a sectional view of the injection molding nozzle of FIG. 1 taken perpendicular to the slot gate.
Figure 3:
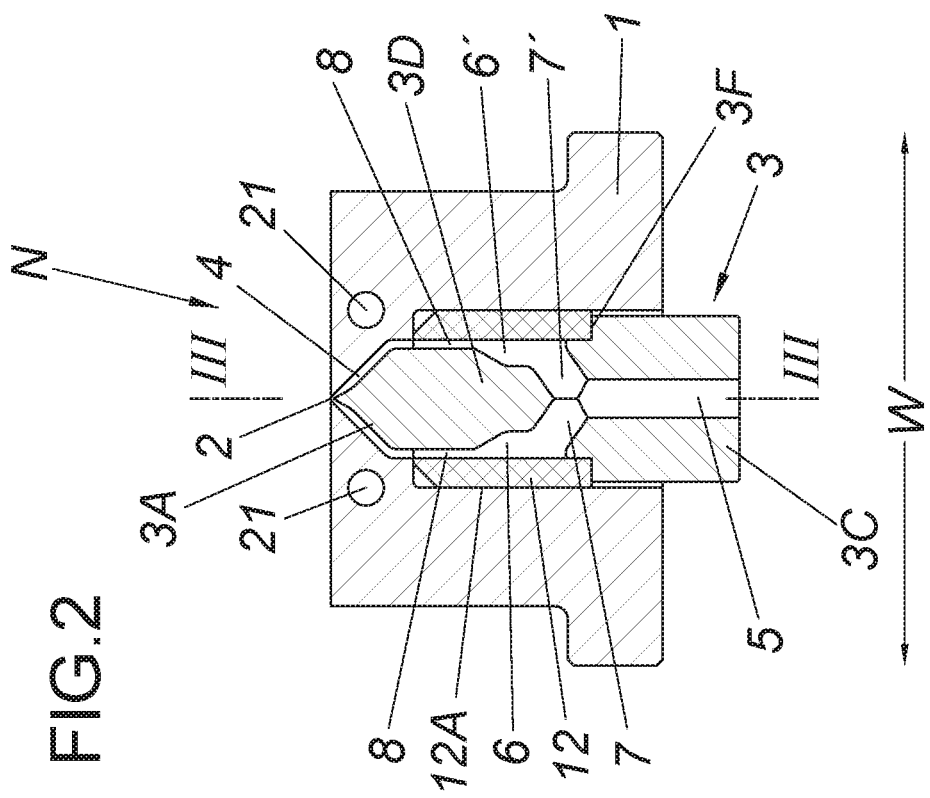
FIG. 3 is a sectional view of FIG. 2 taken along line III-III.

FIG. 1 is a partial sectional view of an injection molding nozzle N in accordance with an embodiment of the present invention. Features and aspects of the current embodiment can be used accordingly with the other embodiments. The injection molding nozzle N as shown in FIG. 1 to FIG. 5 includes a housing 1, forming a nozzle slot 2 having a longitudinal axis $A_L$ extending between two longitudinal sides and across two end portions of the nozzle slot 2. As used herein the term nozzle slot can be interchanged with the term slot gate. In addition to a nozzle core 3, which is incorporated or received in an opening 1A in the housing 1, between the nozzle core 3 and the housing 1, a nozzle runner 4 results. The nozzle runner 4 tapers in the direction of flow (i.e. in the downstream direction), and preferably completely surrounds the nozzle core 3. Continuing with FIG. 1 and also referring to FIGS. 2 and 3, in which FIG. 2 is a sectional view of the injection molding nozzle N of FIG. 1 taken perpendicular to the slot gate 2 and FIG. 3 is a sectional view of FIG. 2 taken along line III-III, parallel to the slot gate 2. The nozzle runner 4 is defined between an externally tapered end portion 3A of the nozzle core 3 which terminates at an edge 3B and an internally tapered portion 1B of the opening 1 in the housing 1 which tapers towards the slot gate 2. When the nozzle core 3 is positioned in the housing 1, the edge 3B of the nozzle core 3 is aligned with the slot gate 2 and is spaced apart from the slot gate 2. As shown in FIGS. 2 and 3, the nozzle runner 4 tapers inward towards the longitudinal axis $A_L$, and can also tapers inward in a direction that is transverse to the longitudinal axis $A_L$ so as to define a flow channel having two elongate sides connected together by end portions which may be curved or round, and the length and with between the respective end portions and side of the nozzle channel decrease in the downstream direction towards the slot gate 2. In order to charge the nozzle runner 4 with molten plastic, the nozzle core 3 features a central feeder channel 5, to which manifolds or distribution channels 6, 6', provided on both of the longitudinal sides of the nozzle core 3 connect. It would also be possible however, not to feed both manifolds 6, 6' by means of a respective ramification or branch channel 7, 7' extending from a common feeder channel 5, but to instead separately feed the manifolds 6, 6' with separate independent feeder channels, for example, in order to be able to inject different plastics in layers. In either case, manifold 6, 6' includes an inlet on one side of the nozzle core 3, which is preferably circular and is in fluid communication with a feeder channel 5, and includes an outlet that extends around the nozzle core 3.

In the current embodiment, the nozzle core 3 includes a base 3C, a body portion 3D, and the tapered end portion 3A. The nozzle core 3 and the opening 1A in which the nozzle core 3 is received are generally oblong, and have a lengths L that are greater than their widths W. In the current embodiment the housing 1 is formed by an insert, which is also oblong, and is receivable in an opening in a mold plate of an injection molding tool, and the insert delimits a portion of the mold cavity and also defines the slot gate 2 leading to the mold cavity.

Figure 5:
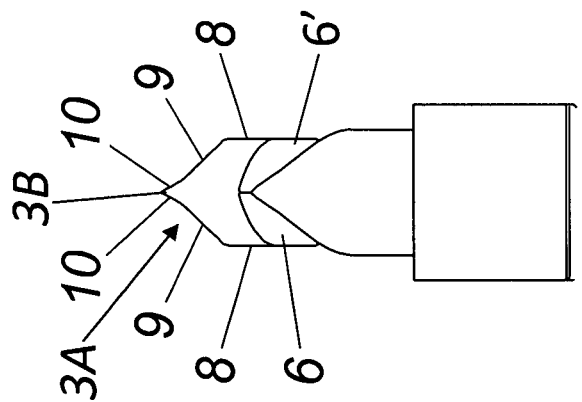
FIG. 5 is an end view of the nozzle core in FIG. 4.
Figure 4:
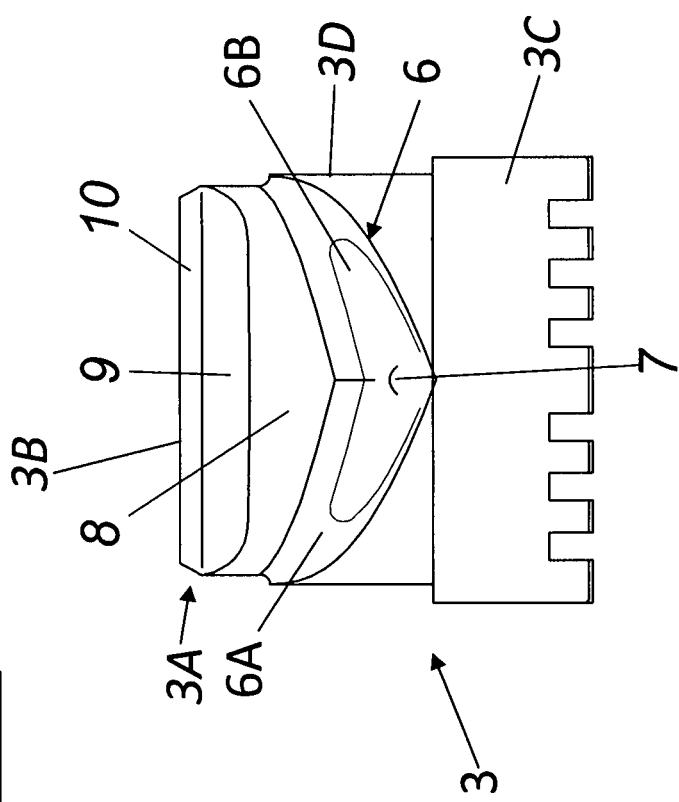
FIG. 4 is a side view of a nozzle core of the injection molding nozzle of FIG. 1.

Continuing with FIGS. 1 to 3, and also referring to FIGS. 4 and 5, in which FIG. 4 is a side view of the nozzle core 3 of the injection molding nozzle N of FIG. 1, and FIG. 5 is an end view of the nozzle core 3 in FIG. 4. The manifolds 6, 6' are symmetrical in relation to the longitudinal axis $A_L$ of the slot gate 2. Further, the manifolds 6, 6' (only one of which may be described below for simplicity) depart or extend from respective ramifications 7 of the central feeder 5. As shown in the page view of FIG. 4 manifold 6 generally curves upward towards the ends of the nozzle core 3 so as to have a generally "V" or "U"-shape. Each manifold 6 forms two symmetrically designed runner branches 6A, 6B, that taper in the direction of flow. The size of the cross-sectional area of the manifold 6 reduces in the downstream direction towards the flow ends of the manifold 6. This change in the cross-sectional area of the manifolds 6, 6' encourages the flow of molding material to have a relatively even flow front as it exits the manifolds 6, 6' whether at the ends or the middle of the longitudinal sides of the nozzle core 3. The flow ends of each runner branch 6A,6B are in fluid communication with the downstream ends of the corresponding runner branches 6A',6B' of the manifold 6' that is on the opposite side of the nozzle core 3. That is, the pair of runner branches 6A, 6B associated with the manifold 6 extend around the nozzle core 3 and are in fluid communication with the respective runner branches 6A', 6B' of the manifold 6' on the opposite side of the nozzle core 3 such that the pair of manifolds 6, 6' distribute molding material, received from a respective ramification 7, 7' around the nozzle core 3 to create a flow of molding material which surrounds the nozzle core 3, thereby creating the design prerequisites for a flow formation of the molten plastic, advantageous to the rheological requirements, over the extension range or length of the slot gate 2. According to the example of embodiment, the manifolds 6, 6', are designed in the shape of a recess' in the longitudinal sides of the nozzle core 3 which are open against a side-wall 1C of the opening 1A in the housing. In this arrangement an internal boundary of the manifold 6 is defined by the nozzle core 3 and an external boundary is defined by the side wall 1C of the nozzle housing, which contributes simple manufacturing conditions, and also promotes heat transfer from the heated nozzle core 3 to the molten plastic within the area of the manifolds 6 as a result of the increase in surface area of the nozzle core 3 due to the recesses. In an alternative embodiment, (now shown) the manifolds 6, 6' are designed in the shape of a recess in the side wall 1C of the housing 1 which is open against the nozzle core 3, and in yet another alternative embodiment (not shown) the manifolds 6, 6' are designed in the shape of a recess in both the nozzle core and the housing. In general, for the embodiments disclosed herein, the manifolds 6, 6' are defined between the nozzle core 3 and the housing 1.

Although two manifolds 6, 6' are depicted; it would also be possible distribute molten plastic around the nozzle core 3 using a single manifold in fluid communication between the nozzle runner 4 and the source of molten plastic. In which case, the single manifold tapers in the direction of flow around the nozzle core 3, and the flow ends of the single manifold meet on a side of the nozzle core opposite from the inlet of the manifold such that an outlet of the manifold extends completely around the nozzle core 3.

In some applications the distribution of the molten plastic around the nozzle core and along the extension range or length of the slot gate 2 may be necessary, yet may not be sufficient in order to establish the intended flow distribution or flow rate over the longitudinal extension of the slot gate 2. This can be achieved by charging the nozzle runner 4 with the molten plastic fed through the manifolds 6, 6' via a throttle zone 8, by which the manifolds 6, 6' are in fluid communication with, or are connected to the nozzle runner 4. The throttle zone 8 is generally established by a constriction of the cross-section of the flow of molten plastic which extends over the length of the section of the slot gate 2 corresponding to the manifold 6, and preferably around the nozzle core 3 so that the molten plastic is exposed to predetermined pressure conditions over the extension range of the slot gate 2. That is, the throttle zone 8 alters the velocity of the flow front of molding material exiting the manifolds 6, 6' so as to promote a desired flow front of molding material in the nozzle runner 4 and ultimately through the slot gate 2. Downstream from the manifolds 6, 6' of the nozzle core 3 is spaced apart from the side wall 1C of the opening 1A in the housing so as to define the throttle zone 8 which preferably extends around the nozzle core. An inner boundary of the throttle zone 8 is defined by the nozzle core 3, and includes two spaced apart longitudinal sides extending parallel to the longitudinal axis $A_L$ of the slot gate 2 that are joined together by respective end portions. The nozzle runner 4 extends from the throttle zone 8 and tapers in the direction of flow transitioning the flattened annular shape of the flow of molding material the throttle zone 8 into the band shaped flow of material that is injected through the slot gate 2. As can be seen in FIGS. 1 and 5, in the current embodiment, the flow ends of the first manifold 6 connect to the respective flow ends of the second manifold 6' prior to the throttle zone 8. Further, in the embodiment shown in FIGS. 1 to 5, the length of the throttle zone 8 is relatively longer near to the inlet to manifold 6, where the cross-sectional area of the manifolds 6 is also relatively larger in comparison to the length of the throttle zone 8 near to the ends of each runner branch 6A, 6B where the cross-sectional area of the manifolds 6 is also relatively smaller. This difference in the length of the throttle zone 8 restricts or reduces the flow and thus the velocity injected molding material relatively more where the throttle zone 8 is relatively longer in comparison to where the throttle zone is relatively shorter, which, in the current embodiment results in the velocity of the flow of molding material being greater at the ends than in the middle of the of the slot gate 2. While in some applications it may beneficial to configure the throttle zone 8 so as to create the flow velocity described above; however, in other applications it may be beneficial to configure the throttle zone 8 to promote a uniform or even flow velocity along the length of the slot gate 2, and in still in other applications it may be beneficial to configure the throttle zone 8 so as to promote a flow velocity that is greater at the middle than at the ends of the slot gate 3. In other words, in order to achieve a desired throughput of molten plastic through the slot gate 2 the throttle zone may be configured such that the resistance created by the throttle zone may be different over the flow cross-section around the nozzle core in order to influence the flow distribution along the length of the slot gate.

For some applications, in order to improve the flow conditions for the molten plastic emerging from the slot gate 2, the downstream end of the nozzle core 3 and/or the housing 1 may be shaped to such that the nozzle runner 4 forms, an inflow section 9 connecting to the throttle zone 8, and a downstream outflow section 10 having a smaller angle of inclination relative to the nozzle outflow direction than that of the inflow section 9, as can be gathered in particular from FIGS. 1 and 5. Owing to the smaller angle of inclination of the outflow section 10 relative to the angle of inclination of the inflow section 9, the molten plastic undergoes an additional deviation in the direction of the slot gate 2.

In accordance with the embodiments hereof, a portion nozzle core 3 that is received in the opening 1A in the housing is spaced apart from the housing 1 so as to define a nozzle flow channel there between that includes the manifold 6, the throttle zone 8, and nozzle runner 4. The nozzle flow channel is in fluid communication between a source of molten plastic and the slot gate 2, and at least a downstream portion of the nozzle flow channel that is between the housing 1 and the nozzle core 3 surrounds the nozzle core 3 on all sides so as to create a continuous flow front of molding material between the nozzle core 3 and the housing 1 ahead of or prior to the slot gate 2. The flow front of molding material in the downstream portion of the nozzle flow channel that surrounds the nozzle core 3 on all sides has spaced apart longitudinal sides that are connected together by longitudinal ends, the lengths and widths of which taper in the direction of the direction of flow towards the slot gate 2. Such a configuration promotes relatively higher throughput of molding material into the mold cavity while also reducing the likelihood of weld lines in injection molded parts.

Figure 6:
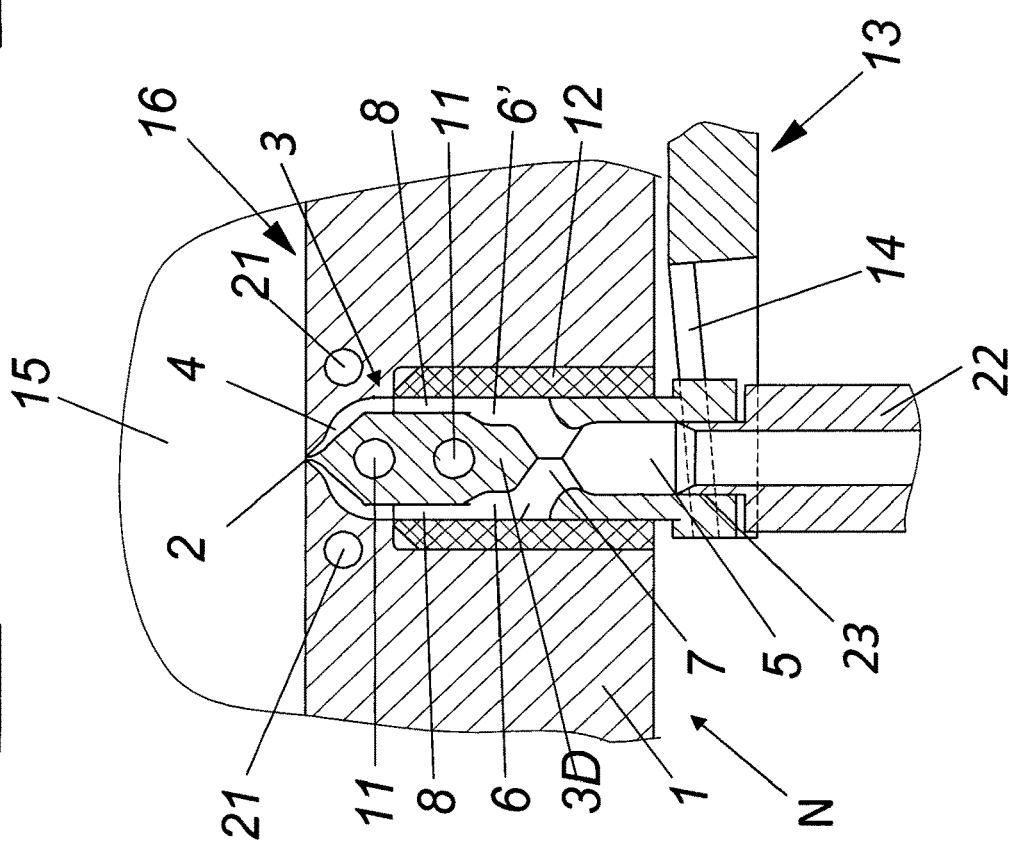
FIG. 6 is a sectional view of an injection molding nozzle in accordance with an embodiment of the present invention having a movably mounted nozzle core that is positioned in a portion of an injection molding tool.

A prerequisite for sprue tear-off on demolding an injection molded component is that the molten plastic does not solidify in the nozzle runner 4. Hence, the nozzle core 3 is heated accordingly in order to be able to supply heat to the molten plastic also in the area of the nozzle runner 4. Although heating of the nozzle core 3, and thus heating of the molding material is also possible via heating the housing 1, in some applications, more favorable heating conditions arise when the nozzle core 3 is heated directly. For this purpose, according to the embodiment presented, electric heating cartridges 11 along with an associated thermocouple (not shown) are incorporated in the nozzle core 3, to control heating of the nozzle core 3. To accommodate wires (not shown) associated with the heaters and/or the thermocouples, the nozzle core 3 may be provided with grooves 3E in the upstream end thereof, through which the wires are routed. According to the example embodiment shown in FIG. 3, the heating cartridges 11 run vertically in relation to the slot gate 2, since owing to the spatial conditions, the heat input into the tapering end section of the nozzle core 3 is thereby facilitated. This arrangement of the heating cartridges 11 is not however mandatory. For example, as shown in FIG. 6, a nozzle core 3 with heating cartridges 11 running parallel to the slot gate 2 is implied. In an alternative embodiment (not shown) electrical heating can also be replaced by heating by means of a heat carrier flowing through a channel in the nozzle core 3.

In order to reduce heat losses due to heat transfer from the molten plastic to the housing 1, the housing 1 can be shielded against the nozzle core 3 by a thermal insulator in the form of a sleeve 12 received in the opening and surrounding the nozzle core 3. An inner surface 12A of the sleeve 12 advantageously forms, at least section-wise, the housing-side wall 1C which defines the external boundary of the manifolds 6, 6'. In the current embodiment the sleeve 12 is a generally elongate oval-shaped body that is positioned between an internal shoulder 1D of the opening 1A and an external shoulder 3F of the nozzle core. More specifically, in the current embodiment a downstream end of the sleeve 12 contacts the internal shoulder 1D of the opening 1A, and an upstream end of the sleeve 12 contacts the external shoulder 3F of the nozzle core 3. In this manner, the sleeve 12 supports the nozzle core 3 in the housing 1. Upstream from the manifold 6, the inner surface of the sleeve 12 forms a fluid seal with the body portion 3D of the nozzle core 3. An outer surface 12B of the sleeve is sized to be received in the opening 1A. When disposed between housing 1 and the nozzle core 3, the sleeve 12 can be considered to be a portion of the housing 1 that defines, in conjunction with the nozzle core 3, the manifolds 6, 6', and at least a portion of the throttle zone 8. As shown in FIG. 2 an upstream portion the throttle zone 8 is defined between the inner surface of the sleeve 12 and the nozzle core 3, and a downstream portion of the throttle zone is defined between the nozzle core 3 and the opening 1A in housing 1. The sleeve 12, surrounding the nozzle core 2 can be made from a material that is more insulative than the material from which the nozzle core 3 and/or the housing 1 is made; however, the sleeve 12 does not itself necessarily need to be manufactured from a heat-insulating material as the sleeve 12 can be separated from the housing by an air gap at intervals between the sleeve 12 and the housing 1, for instance, by the outer surface of the sleeve 12 being provided with fluting. In accordance with the embodiments hereof, in some applications the sleeve 12 may be omitted where it is possible to impede or reduce the heat transfer from the nozzle core 3 to the housing using the molten plastic between the nozzle core 3 and the housing 1, which intrinsically constitutes a poor heat conductor, in such an embodiment the shape of opening 1A in the housing 1 is altered so as to accommodate the absence of the sleeve 12, in order, for example, for the housing 1 to support the nozzle core 3.

Referring now to FIG. 6 which is a sectional view of an injection molding nozzle N in accordance with an embodiment of the present invention. Features and aspects of the current embodiment can be used accordingly with the other embodiments. As opposed to the embodiment according to FIGS. 1 to 5, according to the example embodiment in FIG. 6, the nozzle core 3 is movably mounted in the housing 1 so as to facilitate opening and closing of the slot gate 2. An actuator 13, which in the example of embodiment is designed in the form of a wedge gear 14, serves to adjust or translate the position of the nozzle core 3 between the closed position, shown in FIG. 6, to an open position (not shown), in which the nozzle core 3 is retracted or spaced apart from the slot gate 2 so as to allow molding material to flow therethrough. To accommodate the opening and closing movement of the nozzle core 3, an upstream end of the feeder 5 is engaged with an upstream runner component 22 in a sliding or telescopic connection as shown at 23. Furthermore, as shown in the embodiment of FIG. 6, the housing 1 is formed by a mold plate 16 delimiting the a portion of the mold cavity 15 of an injection molding tool, and the mold plate 16 defines the slot gate 2 leading to the mold cavity. In this configuration a separate housing 1 in the form of an insert for the injection molding nozzle N to be incorporated in such a mold plate 16 may be rendered unnecessary.

Figure 7:
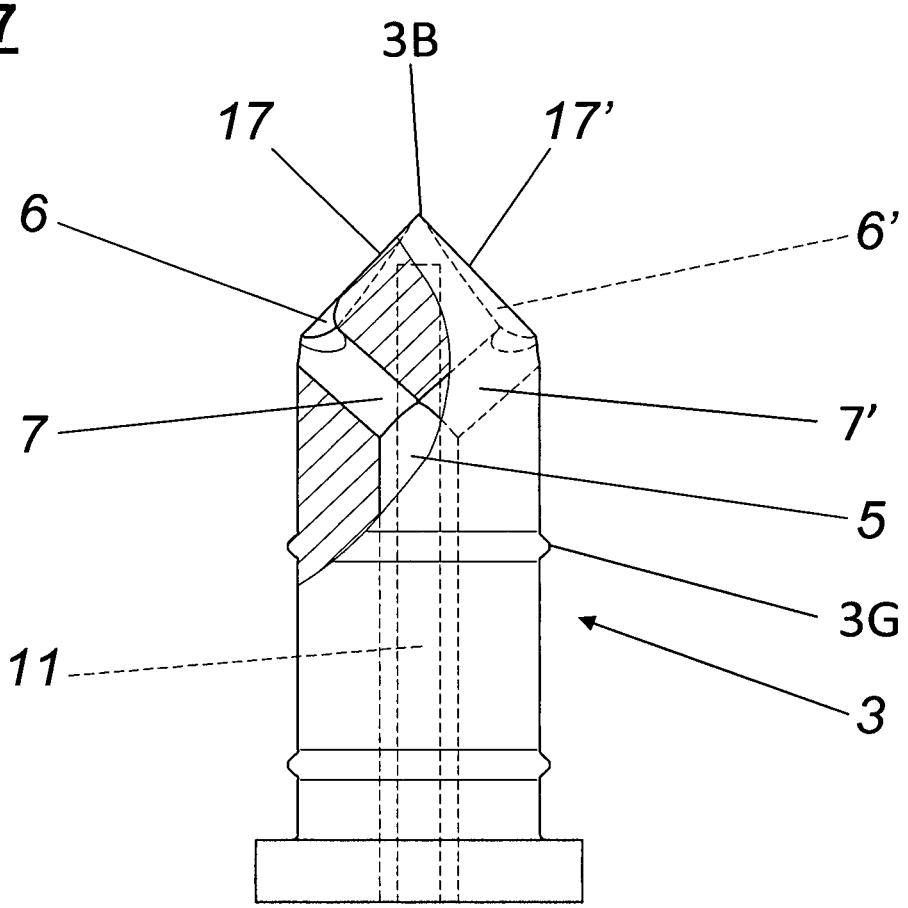
FIG. 7 is a side view of a nozzle core in accordance with an embodiment of the present invention having a cylindrical basic shape and two roof areas.
Figure 8:
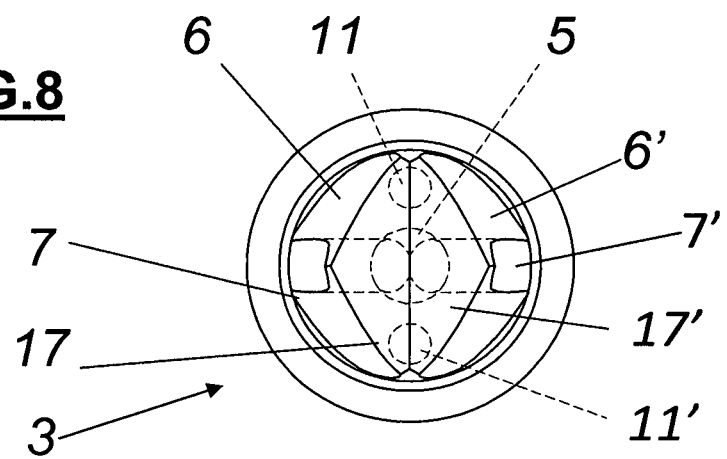
FIG. 8 is a top view of the nozzle core of FIG. 7

Turning now to FIGS. 7 and 8, in which FIG. 7 is a side view of a nozzle core 3 in accordance with an embodiment of the present invention, and FIG. 8 is a top view of the nozzle core of FIG. 7. Features and aspects of the current embodiment can be used accordingly with the other embodiments. FIGS. 7 and 8 show what for some applications is a particularly advantageous embodiment of a nozzle core 3, as the plain cylindrical basic shape of this nozzle core 3 corresponds to that of a more commonly known round injection molding nozzle. Owing to the plain cylindrical basic shape, simple sealing conditions may be realized between the nozzle core 3 and the housing 1. To facilitate sealing, the nozzle core 3 includes a sealing ring 3G extending radially outward from the body portion 3D that is sized to contact the opening in the housing (not shown) so as to limit or prevent egress of molding material in the upstream direction from between the nozzle core 3 and the housing in which the nozzle core is received. In order to facilitate that a nozzle runner 4 ending in a slot gate 2 can be achieved, the cylindrical nozzle core 3 is provided in the area of the nozzle runner 4 with two roof areas 17, 17' that terminate at an edge 3B which, in operation is aligned with, the slot gate (not shown in FIGS. 7 and 8). Roof areas 17, 17' are symmetrical in relation to the longitudinal axis $A_L$ of the slot gate 2, and delimit the inside boundary of the manifolds 6, 6' and the nozzle runner 4. In the current embodiment, the supply of melt is provided through a central feeder 5 with ramifications 7, 7' to which the manifolds 6, 6' are connected. Also implied in FIGS. 7 and 8, the nozzle core 3 is configured to receive a pair of heaters 11 which extend between the two roof areas 17, 17' on either side of the central feeder 5, and in line with the slot gate. In the configuration of the nozzle core 3 shown in FIGS. 7 and 8, the length of the slot gate 2 may be restricted to the diameter of the nozzle core 3. In the current embodiment, charging of the nozzle runner 4 is also facilitated through a throttle zone 8 by means of cross-sectional constriction in the flow of molding materials, which is not represented in further details for the sake of clarity.

Referring now to FIGS. 9, 10, and 11, in which FIG. 9 is a perspective view of a nozzle core 3 in accordance with an embodiment of the present invention for use with a housing 1 having a cross-shaped slot gate 3, FIG. 10 is an enlarged top view of the nozzle core 3 of FIG. 9, and FIG. 11 is a perspective sectional view of the nozzle housing 1 for use with the nozzle core 3 of FIGS. 9 and 10. Features and aspects of the current embodiment can be used accordingly with the other embodiments. In order to increase the melt throughput despite the spatial restriction dictated by the cylindrical housing 1 receiving a cylindrical nozzle core 3, the slot gate 2 and the nozzle runner 4 ending at the slot gate 2 may feature a plurality of branches 18, as is illustrated in FIGS. 9 to 11. According to the example of embodiment according to FIG. 11, the housing 1 forms the slot gate 2 in the shape of a cross recess with four branches 18 leading out from a center. In FIG. 10, the slot gate 2 with its four branches 18 connecting to form a cross recess or opening is implied by a dot-dashed line in its position opposite the nozzle core 3. The nozzle core 3, cylindrical in its basic shape, is provided according to FIGS. 9 and 10 in the area of the nozzle runner 4 with two pairs of roof areas 17 positioned transverse to each other and corresponding pair-wise to the branches 18 of the slot gate 2, and which end in cross-shaped edges 3B, 3B' corresponding to the cross shape of the slot gate 2. Between the roof areas 17 of the nozzle core 3 and corresponding external flow boundary surfaces 19 of the housing 1, with the nozzle core 3 incorporated in the housing 1, the nozzle runner 4 leading into the cross recess is formed, and to which two pairs of manifolds 6, 6' formed in the nozzle core 3 are allocated section-wise. Each pair of manifolds 6, 6' are connected to a respective feeder 5 on mutually opposite sides of the nozzle core 3 by means of a respective ramification 7, 7'. The resulting melt channel arrangement includes four manifolds 6 distributed evenly around the nozzle core 3, each manifold 6 having runner branches 6A, 6B that extend towards a distal end of a roof area 17. Charging of the nozzle runner 4 is in this case is also facilitated through a throttle zone by means of corresponding cross-sectional constrictions, which is not represented in further details for the sake of clarity. As implied in FIGS. 9 and 11, the nozzle core 3 is heated by means of a central heating cartridge 11.

Figure 12:
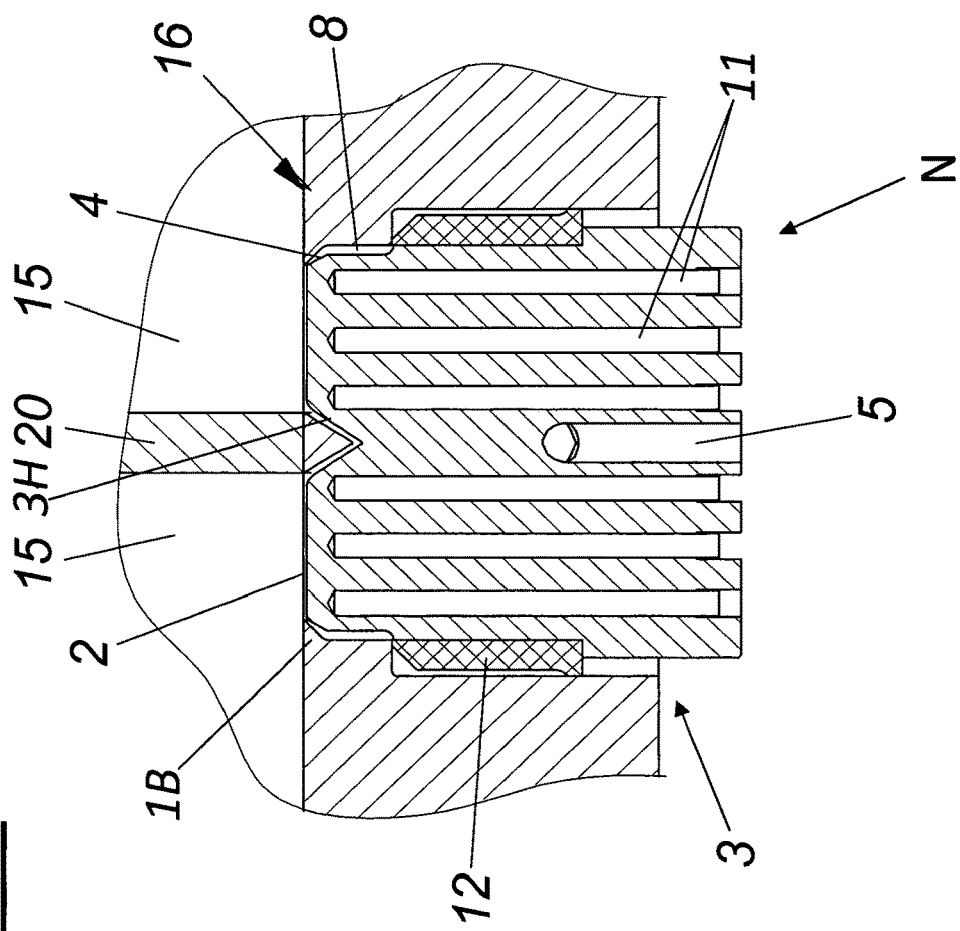
FIG. 12 is a sectional view of an injection molding nozzle in accordance with an embodiment hereof which is positioned in an injection molding tool and extends between two mold cavities.

FIG. 12 is a sectional view of an injection molding nozzle N in accordance with an embodiment hereof which is positioned in an injection molding tool and extends between two mold cavities. Features and aspects of the current embodiment can be used accordingly with the other embodiments. When an injection molding tool features several cavities 15 separated from one another by a partition 20, as implied in FIG. 12, the cavities 15 can be charged or fed by a common injection molding nozzle N, the slot gate 2 of which extends, according to FIG. 9, on both sides of the partition 20. Also shown in FIG. 12, the partition 20 is shaped so as to projects into a groove or depression 3H in the downstream end of the nozzle core. In the current embodiment, consideration is to be given to the course of the partition 20 with regard to the distribution of the molten plastic over the extension range of the slot gate 2.

Owing to the introduction of the molten plastic into the cavity 15 of an injection molding tool through a slot gate 2, the shear stress of the molten plastic can be kept comparatively low in relation to the possible melt throughput, which may represent an important factor for protecting the desired properties of the molten plastic as it is injected into the mold cavity 15. The sprue tear-off depends on the strength characteristics of the plastic prevailing in the area of the slot gate 2, which is solid within the cavity 15 during demolding, yet is molten in the sprue area, so that in the transition area from the cavity 15 to the nozzle runner 4, a high temperature gradient results within a thin layer in the area of the slot gate 2, as a result of which the prerequisites for tear-off of the sprue along the area determined by the opening of the slot gate 2. To this end, it is recommended that the housing be cooled in the area of the slot gate 2. In FIGS. 1, 2 and 6, cooling channels 21, which are aligned with the longitudinal axis $A_L$ of the slot gate 2 for this purpose are implied. Hence, with appropriate selection of the influencing parameters, the tear-off surface can be transferred into the mold surface of the respective injection molded component, reducing the likelihood of needing any post-processing of the sprue tear-off. The sprue is thus displaced into the area of the nozzle runner 4 remains molten.

In some applications particularly advantageous demolding conditions may result in this context according to FIG. 6, if the possibility exists of closing the slot gate 2 by means of the nozzle core 3.

A sample of the methods and apparatus that are described herein could also be as follows:

A1. A method for manufacturing injection molded components from plastic using an injection molding tool, wherein the molten plastic is injected in the form of at least one band-shaped extrudate through a slot gate (2) into a cavity (15) of the injection molding tool before the injection molded component is demolded The molten plastic is supplied with heat in the sprue area during solidification in the cavity (15) and in that the sprue during demolding of the injection molded component tears off along the nozzle slot (2) owing to the temperature gradient between the solidified injection molded component and the molten plastic in the sprue area.

In order to ensure that, in the case of injection molding tools, the molten plastic does not cool down in the injection molding nozzle, it is known (DE 26 07 644 A1) to install in the housing, featuring a round nozzle opening, of the injection molding nozzle a heat-conducting, heatable nozzle core coaxial to the nozzle opening, ending in a conical tip, so that between the housing and the conical tip of the nozzle core, a nozzle runner for the molten plastic, tapering in the direction of flow, annular and ending in the round nozzle opening of the housing, results. The disadvantage with injection molding nozzles of this kind is that the achievable melt throughput is limited, since an increase in the flow velocity results in greater shear stress of the molten plastic in the nozzle runner and therefore additional heating increase of the molten plastic with the risk of material damage. If on the other hand the size of the nozzle opening is increased, higher melt temperatures in the central area of the nozzle opening are to be expected resulting in uneven solidification of the melt flow introduced into the cavity of the molding tool, which may not only incur losses in quality of the injection molded component, but also difficulties in the tear-off behavior of the sprue. For the above reasons, several injection molding nozzles are used for manufacturing larger volume injection molded components, which call for a comparatively complex control system and under certain circumstances increase the risk of occurrence of weld lines in the joint area within the cavity of coalescing melt flows, so that on the one hand material damage in the area of the weld lines and on the other hand impairment of the visual appearance of the injection molded components is to be expected.

In order to be able to inject the molten plastic into the cavity of the molding tool in a flow adapted to the shape of the injection molded components, particularly for plate-type injection molded components, the molten plastic is introduced into the cavity in a band-shaped extrudate by means of a film gate. The film gate comprises in this case a nozzle runner that widens over the length of a slot gate opening into the cavity. Although the melt throughput through the nozzle opening can be increased with the aid of film gates of this kind, the film gate however solidifies with the molten plastic in the cavity so that the film gate demolded with the injection molded component subsequently needs to be separated from the injection molded component.

The problem therefore is to develop a method for injecting molten plastic into a cavity in such a way that acceptable sprue tear-off can be ensured even with high melt throughputs, without having to fear unacceptable impairment of the quality of the injection molded component.

Based on a method of the aforementioned type, the problem at hand is solved in that the molten plastic is supplied with heat in the molding area during solidification in the cavity and in that the sprue during demolding of the injection molded component tears off along the slot gate owing at least in part to the temperature gradient between the solidified injection molded component and the molten plastic in the sprue area.

B1. An injection molding nozzle for introducing a molten plastic into a cavity (15) of an injection molding tool with a housing (1) receiving a heatable nozzle core (3), with a nozzle runner (4) ending in a nozzle opening and tapering in the direction of flow between the housing (1) and the nozzle core (3) and with a manifold (6) between a feeder (5) for the molten plastic and the nozzle runner (4). The nozzle opening forms a nozzle slot (2) and in that the nozzle runner (4) adapted to the nozzle slot (2) connects to at least one manifold (6), which is in fluid communication with the nozzle runner (4) by means of a throttle zone (8).

B2. The injection molding nozzle according to B1, wherein the throttle zone (8) forms a constriction of the flow cross-section extending over the length of the longitudinal section of the nozzle slot (2) corresponding to the manifold (6).

B3. The injection molding nozzle according to B1 or B2 in wherein the flow cross-section of the manifold (6) tapers in the direction of flow.

B4. The injection molding nozzle according to any of B1 to B3, wherein the flow resistance of the throttle zone (8) changes over the length of the longitudinal section of the nozzle slot (2) corresponding to the manifold (6).

B5. The injection molding nozzle according to any of B1 to B4, wherein the nozzle core (3) forms the manifold (6) in the shape of a recess open against the housing (1).

B6. The injection molding nozzle according to any of B1 to B5, wherein the nozzle runner (4) surrounds the nozzle core (3) on all sides.

B7. The injection molding nozzle according to any of B1 to B6, wherein the nozzle runner (4) is connected to at least two manifolds (6).

B8. The injection molding nozzle according to B7, wherein the manifolds (6) are connected to each other at their flow ends.

B9. The injection molding nozzle according to any of B1 to B8, wherein the nozzle core (3) forms an inflow section (9) connecting to the throttle zone (8) in the area of the nozzle runner (4) and a downstream outflow section (10) presenting a smaller angle of inclination in relation to the nozzle outflow direction in comparison to that of the inflow section (9).

B10. The injection molding nozzle according to any of B1 to B9, wherein the housing (1) features a thermal insulation (12) against the heated nozzle core (3).

B11. The injection molding nozzle according to any of B1 to B10, wherein the nozzle core (3) for closing the nozzle slot (2) is movably mounted in the housing (1).

B12. The injection molding nozzle according to any of B1 to B11, wherein the housing (1) is cooled in the area of the nozzle slot (2).

B13. The injection molding nozzle according to any of B1 to B12, wherein the housing (1) forms a mold plate (16) delimiting the cavity (15) of the injection molding tool.

B14. The injection molding nozzle according to any of B1 to B13, wherein the nozzle slot (2) and the nozzle runner (4) leading into the nozzle slot (2) feature several branches (18) preferably arranged in a star shape.

B15. The injection molding nozzle according to any of B1 to B14, wherein the nozzle core (3) has a plain cylindrical basic shape with two roof areas (17) symmetrical in relation to the longitudinal axis of the nozzle slot (2) and of the respective branch (18) of the nozzle slot (2) in the area of the nozzle runner (4).

B16. The injection molding tool with an injection molding nozzle according to any of B1 to B15, wherein in the arrangement of two or several cavities (15), a common injection molding nozzle is allocated to at least two cavities (15), with its nozzle slot (2) extending on both sides of a partition (20) between the cavities (15).

While various embodiments have been described above, it should be understood that they have been presented only as illustrations and examples of the present invention, and not by way of limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the appended claims and their equivalents. It will also be understood that each feature of each embodiment discussed herein, and of each reference cited herein, can be used in combination with the features of any other embodiment. All patents and publications discussed herein are incorporated by reference herein in their entirety.

The invention claimed is:

1. An injection molding nozzle for introducing a molten plastic to a mold cavity of an injection molding tool via a slot gate, the injection molding nozzle comprising:

a nozzle core having an elongate edge and received in an opening in a housing,
wherein a nozzle flow channel is defined between the nozzle core and the housing, the nozzle flow channel providing fluid communication between a source of the molten plastic and the slot gate, the nozzle flow channel including
a nozzle runner defining a downstream portion of the nozzle flow channel between the housing and the nozzle core that surrounds the nozzle core on all sides, the nozzle runner tapering in the direction of flow and being defined between an externally tapered portion of the nozzle core that tapers towards the elongate edge and an internally tapered portion of the housing that tapers towards the slot gate,
a manifold having an upstream inlet in fluid communication with the source of the molten plastic, the manifold having an outlet extending on opposite sides of the nozzle core in the form of first and second runner branches, the first and second runner branches being recesses within the opposite sides of the nozzle core, and each of the first and second runner branches having a cross-sectional area that reduces in a downstream direction from the upstream inlet of the manifold to respective downstream ends of the first and second runner branches, and
a throttle zone extending between the first and second runner branches of the manifold and the nozzle runner, by which the manifold is in fluid communication with the nozzle runner, wherein the throttle zone forms a constriction of flow of the molten plastic completely extending around the nozzle core, wherein the throttle zone has a first longitudinal length between the upstream inlet of the manifold and the nozzle runner, and a second longitudinal length between the downstream ends of the first and second runner branches of the manifold and the nozzle runner, with the first longitudinal length being different from the second longitudinal length; and
a heater incorporated in the nozzle core, wherein insulation is provided between the housing and the nozzle core that is configured to thermally insulate the housing against the heated nozzle core.

2. The injection molding nozzle according to claim 1, wherein the upstream inlet of the manifold is in fluid communication with a feeder channel of the nozzle.

3. The injection molding nozzle according to claim 1, wherein a flow resistance of the throttle zone differentiates along a length of the slot gate due to a first flow resistance created by the first longitudinal length of the throttle zone being different from a flow resistance created by the second longitudinal length of the throttle zone.

4. The injection molding nozzle according to claim 1, wherein the nozzle runner forms an inflow section connecting to the throttle zone and a downstream outflow section leading to the slot gate, the downstream outflow section having a smaller angle of inclination relative to the outflow direction of the slot gate in comparison to an angle of inclination of the inflow section relative to the outflow direction of the slot gate.

5. The injection molding nozzle according to claim 1, wherein the manifold is a first manifold with the first and second runner branches, and the nozzle further comprises a second manifold having an outlet extending on opposite sides of the nozzle core in the form of third and fourth runner branches, the third and fourth runner branches being recesses within the opposite sides of the nozzle core, and each of the third and fourth runner branches having a cross-sectional area that reduces in a downstream direction from an upstream inlet of the second manifold to respective downstream ends of the third and fourth runner branches, and wherein the first and second manifolds are symmetrical in relation to a longitudinal axis of the slot gate and together surround the nozzle core.

6. The injection molding nozzle according to claim 5, wherein the downstream ends of the first and second runner branches of the first manifold are in fluid communication with the respective downstream ends of the third and fourth runner branches of the second manifold.

7. The injection molding nozzle according to claim 6, wherein the downstream ends of the first and second runner branches of the first manifold connect to the respective downstream ends of the third and fourth runner branches of the second manifold prior to the throttle zone.

8. The injection molding nozzle according to claim 5, wherein the throttle zone further extends between the third and fourth runner branches of the second manifold and the nozzle runner, and wherein the throttle zone has the first longitudinal length between the upstream inlet of the second manifold and the nozzle runner, and the second longitudinal length between the downstream ends of the third and fourth runner branches of the second manifold and the nozzle runner.

9. The injection molding nozzle according to claim 1, wherein at least an internal boundary of the first and second runner branches of the manifold is formed by the recesses in the nozzle core.

10. The injection molding nozzle according to claim 9, wherein an external boundary of the first and second runner branches of the manifold is defined by a side wall of the opening in the housing.

11. The injection molding nozzle according to claim 1, further comprising a sleeve received in the opening in the housing and surrounding the nozzle core, and wherein an external boundary of the manifold is defined by an internal wall of the sleeve.

12. The injection molding nozzle according to claim 11, wherein the internal wall of the sleeve further defines at least a portion of an external boundary of the throttle zone.

13. The injection molding nozzle according to claim 11, wherein the sleeve is positioned between an internal shoulder of the opening in the housing and an external shoulder of the nozzle core.

14. The injection molding nozzle according to claim 11, wherein the sleeve forms a fluid seal with a body portion of the nozzle core that is upstream from the nozzle flow channel.

15. The injection molding nozzle according to claim 11, wherein the sleeve is made from a material that is more insulative than a material from which the nozzle core and/or the housing is made.

16. The injection molding nozzle according to claim 1, wherein the nozzle core and the opening in the housing are oblong, each having lengths that are greater than their widths.

17. The injection molding nozzle according to claim 1, wherein the nozzle core and the opening in the housing are cylindrical, and the nozzle core includes a pair of roof areas symmetrical in relation to a longitudinal axis of the slot gate.

18. The injection molding nozzle according to claim 17, wherein the slot gate features a plurality of branches, and the nozzle core features a plurality of pairs of roof areas corresponding to the plurality of branches, wherein the plurality of pairs of roof areas end in a plurality of edges corresponding to a shape of the slot gate.

19. The injection molding nozzle according to claim 1, wherein the housing includes a cooling channel that is aligned with a longitudinal axis of the slot gate.

20. The injection molding nozzle according to claim 1, wherein the nozzle core is movable within the housing for closing the slot gate.

21. The injection molding nozzle according to claim 20, further comprising a mold plate that defines the housing, delimits a portion of the mold cavity, and defines the slot gate leading to the mold cavity.

22. The injection molding nozzle according to claim 1, wherein the housing comprises an insert receivable in an opening in a mold plate, and wherein the insert delimits a portion of the mold cavity and defines the slot gate leading to the mold cavity.

23. An injection molding tool having an injection molding nozzle according to claim 1, wherein the injection molding tool includes a pair of mold cavities separated by a partition, and the pair of mold cavities are fed by a common injection molding nozzle, which extends on both side of the partition.

24. The injection molding nozzle according to claim 1, wherein the first longitudinal length of the throttle zone is greater than the second longitudinal length of the throttle zone.

25. The injection molding nozzle according to claim 1, wherein the first longitudinal length of the throttle zone is less than the second longitudinal length of the throttle zone.

* * * * *